Figure 2:
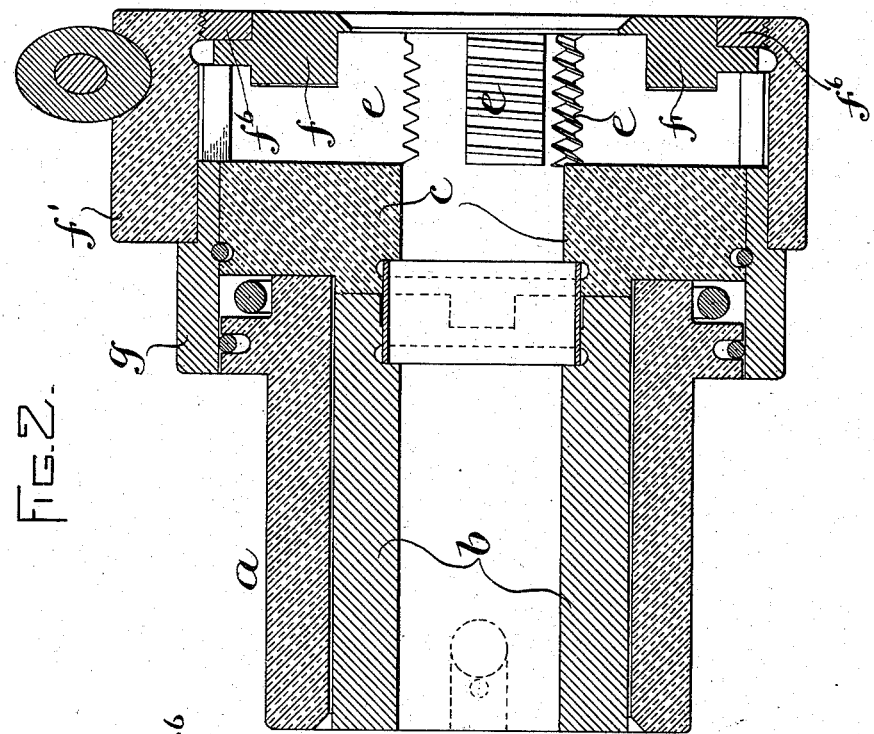

(No Model.) 4 Sheets—Sheet 1.
J. HARTNESS.
SCREW CUTTING DIE.
No. 565,746. Patented Aug. 11, 1896.
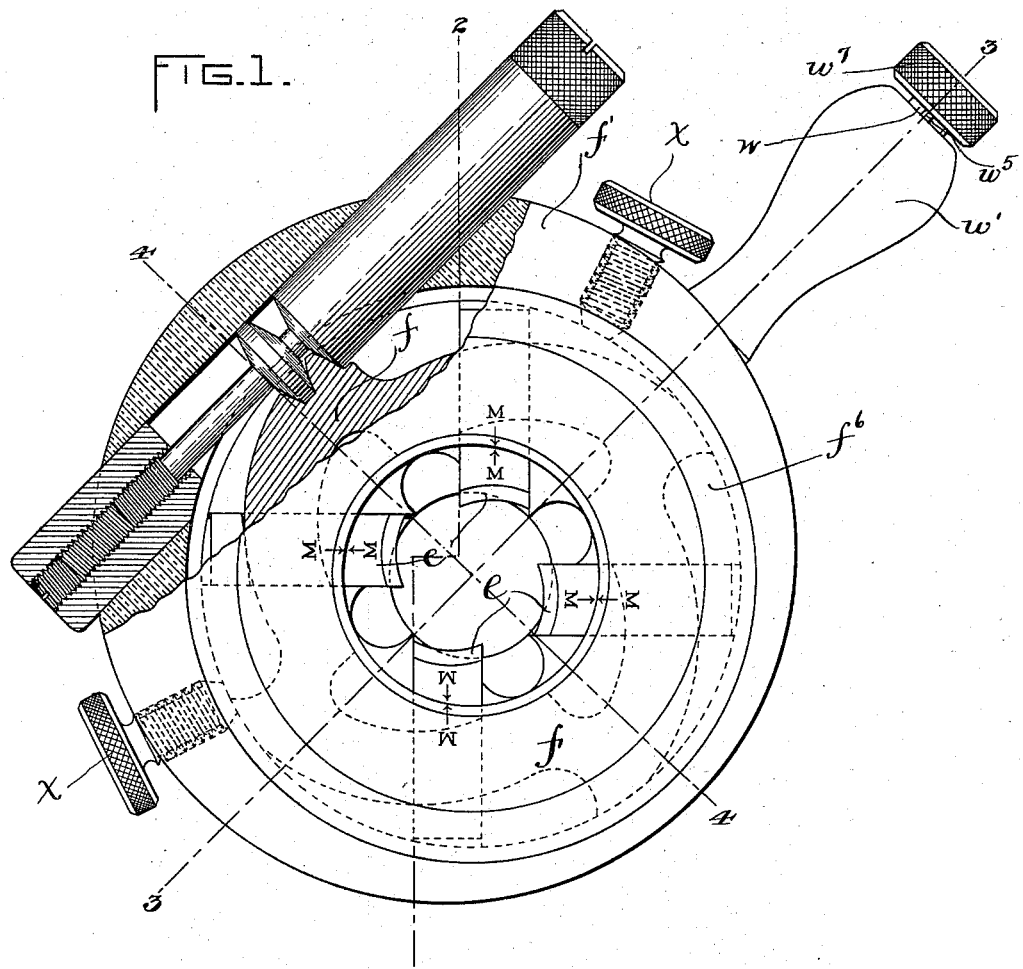
FIG. 1.
FIG. 8.
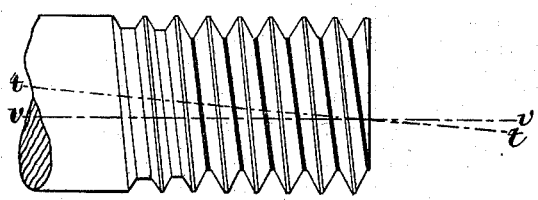
WITNESSES:
INVENTOR:
James Hartness (No Model.) 4 Sheets—Sheet 2.

J. HARTNESS.
SCREW CUTTING DIE.

No. 565,746. Patented Aug. 11, 1896.

WITNESSES:
A. D. Harrison
W. P. Abell

INVENTOR:
James Hartness
by Wright Brown Quinby
Attys.

(No Model.) 4 Sheets—Sheet 3.
J. HARTNESS.
SCREW CUTTING DIE.
No. 565,746. Patented Aug. 11, 1896.
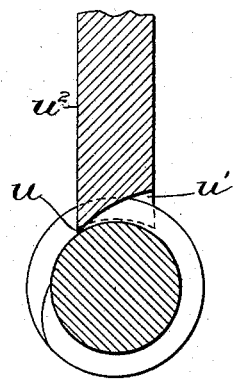
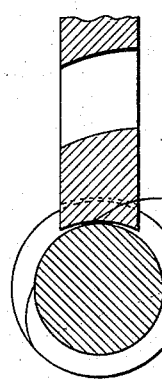
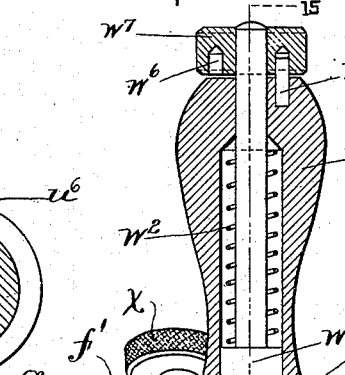
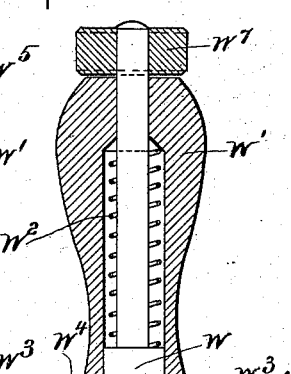
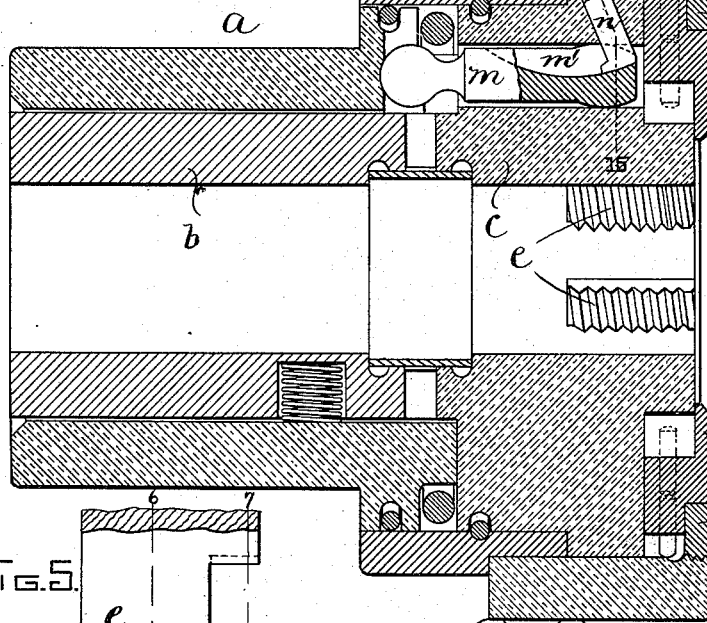
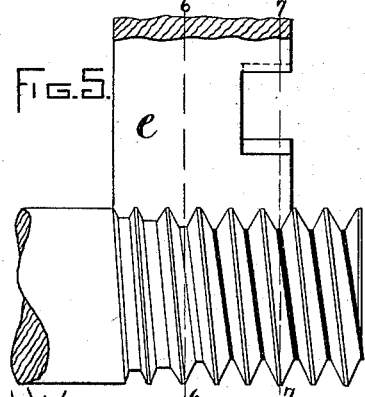
INVENTOR:
James Hartness
WITNESSES (No Model.)
4 Sheets—Sheet 4.
J. HARTNESS.
SCREW CUTTING DIE.
No. 565,746.
Patented Aug. 11, 1896.
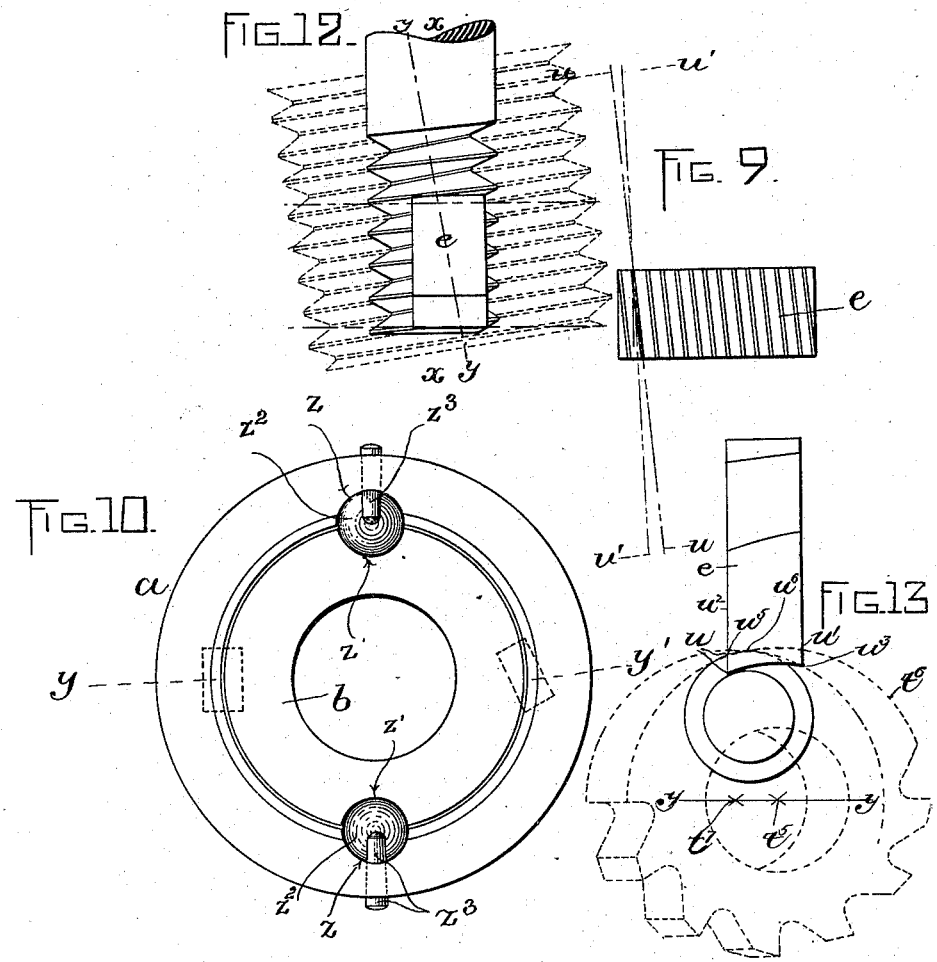
WITNESSES:
INVENTOR

UNITED STATES PATENT OFFICE.

JAMES HARTNESS, OF SPRINGFIELD, VERMONT.

SCREW-CUTTING DIE.

SPECIFICATION forming part of Letters Patent No. 565,746, dated August 11, 1896.

Application filed July 15, 1895. Serial No. 555,946. (No model.)

*To all whom it may concern:*

Be it known that I, JAMES HARTNESS, of Springfield, in the county of Windsor and State of Vermont, have invented certain new and useful Improvements in Screw-Cutting Dies, of which the following is a specification.

This invention relates to screw-cutting dies, such as employed in turret-lathes and other machines, and some of the improvements herein described are more particularly applicable to the type of die shown in former patent, No. 529,169, granted to me November 13, 1894, while others of them are equally applicable to other types of dies.

One object of the invention is to better regulate the lead of the die so as to insure absolute uniformity in the work.

Heretofore it has been found well nigh impossible to secure perfect uniformity in any considerable length of screw-cutting by the use of a die, for while the thread may not vary to any appreciable extent throughout, say, one inch of the thread, yet at the end of, say, six inches, it is seldom found of the correct pitch and will vary as much as a sixty-fourth, which is a serious defect. For this reason it has heretofore been found necessary to resort to the engine-lathe for chasing a thread with an assured perfect lead. It has been the practice in making chasers for screw-cutting dies to give the chaser the same clearance throughout its length, in some cases giving a greater clearance at the back portion of the chaser and in some cases providing for no contact whatever of the back portion of the chaser with the work. Such formations give opportunity for variance in the pitch of the thread, because the lead of the die is not absolutely controlled. By my invention I propose to control the lead by having the back portion of the chaser (*i. e.*, that portion back of the teeth which do the actual cutting) serve as a nut, closely embracing the work and fitting the thread with a line-contact extending back into the body of the die and no contact at the front edge thereof or along the line of the points of these back teeth. This involves a novel formation of the chaser, to be hereinafter specifically described with reference to the accompanying drawings.

Another object of my invention is to make provision for changing the lead of the die to secure different effects in the thread-cutting, and this involves a peculiar relation between the chasers and their controlling means, which will be hereinafter specifically described.

Still another object of the invention is to provide for quickly changing the diametrical adjustment of the die to adapt it for roughing-out or for finishing work.

The invention also aims to improve the general construction of the die.

With the above ends in view the invention consists in a number of novel constructions and combinations of parts which will be found recited in the appended claims.

The drawings which accompany and form part of this specification illustrate an embodiment of the invention.

Figure 4:
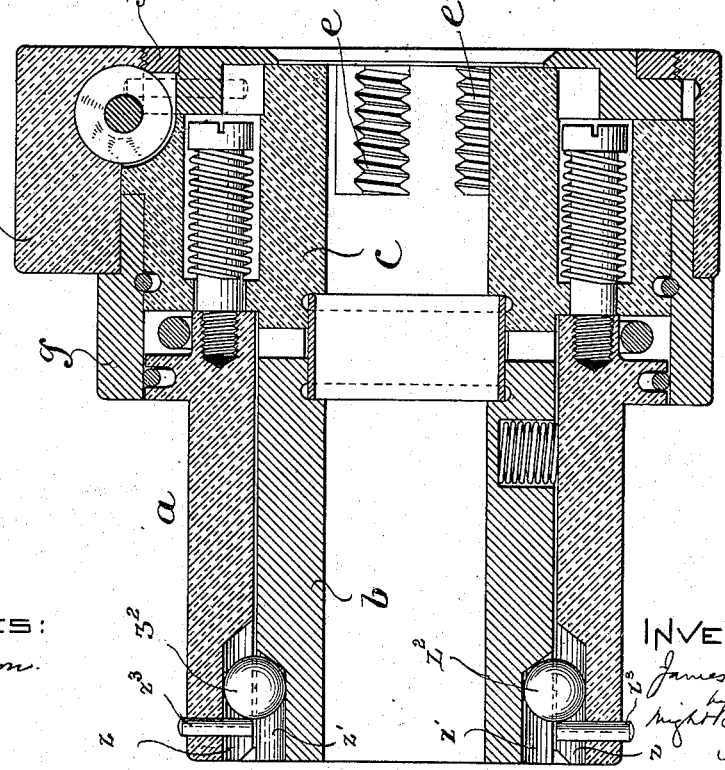

Figure 1 shows a face view of the die partially broken away and sectionalized. Figs. 2, 3, and 4 show sections on lines 2 2, 3 3, and 4 4 of Fig. 1. Fig. 5 shows in side elevation a chaser and a piece of work being operated upon. Figs. 6 and 7 show sections taken on lines 6 6 and 7 7 of Fig. 5. Fig. 8 shows a plan view of the work, with dotted lines indicating the relation of the chaser thereto. Fig. 9 shows a face view of a chaser for use when provision is made in the die for changing the lead, dotted lines being here used to demonstrate the effect. Fig. 10 is a rear end view of the die, illustrating certain modifications in the construction of the antifriction-spline between the die-shank and the main holder. Fig. 11 shows a section taken on line 11 11 of Fig. 3. Fig. 12 shows a top plan view of a piece of work and a chaser-cutter thereover, together with a broken-line illustration of a milling-cutter by which the form of chaser shown in Figs. 5 to 7 is produced. Fig. 13 shows the same parts in end elevation.

In general construction the die closely resembles that shown in my former patent above referred to, and a brief enumeration of the principal members of the die will suffice, without setting forth the details of construction described in said patent.

The letter $a$ designates the main holder; $b$ and $c$, the two members of the die-body, $b$ being what I have hereinbefore referred to as the "shank;" $e$, the chaser-cutters; $f$, the cam engaging said cutters and by its rotary movement opening and closing the same; $f'$, the cylindrical cam-holder adjustably connected with the cam and rotatable on the member $c$ of the die-body, and $g$ the spring-pressed collar connected with the cam-holder and employed for automatic opening purposes.

In order to minimize friction between the shank $b$ and the holder $a$ under working strain, these parts are rotatively connected together by means of rolling splines, either in the form of balls or rollers.

In Fig. 4 the two parts mentioned are shown as formed at opposite sides with confronting longitudinal grooves $z$ and $z'$ semicircular in cross-section, and balls $z^2$ occupy these grooves and are confined by pins $z^3$, entered through the holder $a$.

Disk-like rollers $y$ $y'$ (see Fig. 10) may be employed instead of the balls, with substantially the same effect, the grooves in the shank and holder being correspondingly formed. The roller $y$ is shown as set in with its axis in a plane embracing a diametrical line of the die, and the grooves in which it runs are rectangular in cross-section. This roller will take a thrust in either direction, and hence is adapted to both right and left hand dies. The roller $y'$ is shown set in angularly and engaging grooves triangular in cross-section. This roller is thus adapted to take a thrust in one direction only.

It will be readily recognized that any of the forms of connection above described intervening between the holder and shank constitute an antifriction-spline minimizing friction in longitudinal movement of the shank in the holder under working strain.

Instead of the bayonet form of connection between the spring-pressed ring $g$ and the cam-holder $f'$ shown in my former patent I now use knurl-headed taper-pointed screws $x$, entered through the cam-holder and engaging sockets in the ring, and instead of the pivoted latch of said former patent I employ a sliding bolt $w$, fitted through a handle $w'$, which is screwed into the cam-holder. A spiral spring $w^2$ surrounds a reduced part of the said bolt and exerts itself to produce locking engagement between the latter and the die-body. The bolt is likewise rotatable and is cut out in opposite sides at its inner end, as shown at $w^3$ and $w^4$, Fig. 11, one cut extending nearer to the longitudinal center of the bolt than the other. The locking engagement of the bolt with the die-body is in these cut-out places, and to change the adjustment of the die it is only necessary to turn the bolt half-way around. Thus the die can be quickly changed from finishing to roughing-out adjustment, and vice versa, by varying its cutting diameter.

The same coaction is had between the sliding bolt and the automatic opening devices as between the pivoted latch of my former patent and those devices.

There is a slight difference in form of the ball-headed block $m$, in that it is grooved longitudinally, as shown at $m'$ in Fig. 3, to receive the tappet-piece or releasing-pin $n$, said groove having an inclined or curving base to act to thrust the pin against the bolt $w$, when the die-body member $c$ moves outward longitudinally.

The bolt is locked in its different positions of rotary adjustment by the engagement of a pin $w^5$, fastened in the end of the handle $w'$ with any one of a series of sockets $w^6$ in a knob $w^7$ on the bolt.

Of course there may be more than two cut-out places in the bolt, and as many adjustments may be provided for in this way as required, the principal advantages derived being a saving of time in changing from one adjustment to another.

Another change to be noted over the construction shown in my former patent is that the flange $f^6$ of the cam-holder, instead of being integral with the holder, is a separate ring screwing into said holder. This has to do with the object above stated of changing the lead of the die, for by adjusting this ring the cam which confines the chaser in its socket is caused to move in or out, and its control of the chaser is thus affected. The chaser can be held perfectly square in its seat by screwing the ring up tight, or by loosening said ring the chaser can be allowed to cant under working strain, there being allowed sufficient lateral looseness between the cam and chaser for this purpose. The object of this adjustment is to provide means for varying the depth to which the heel or leading part of the chaser shall enter the thread of the work. Now by cutting the teeth of the chaser at an angle greater than the correct leading angle, the tendency of the chaser will be to lead at the angle of its milling. In Fig. 9 the line $u$ $u$ indicates the angle at which the chaser has been milled, and the line $u'$ $u'$ indicates the correct leading angle. Now by furnishing a means for varying the pressure of the heel of the die into its work, it may be caused to lead slower or to lead up to the angle of its natural clearance, (indicated by line $u$ $u$.)

The object I first stated, namely, that of making the lead positively uniform, may be accomplished in a variety of ways. Figs. 5 to 7 and 12 and 13 illustrate a novel formation of chaser for the purpose, and it may be well to first state that this chaser is produced by the milling process rather than by the use of a helical tap, as commonly practiced in making chasers. In using a milling-tool whose teeth pass around its circumference in true circles instead of helically (which is the kind of tool I propose to use) I work said tool on an angle to the chaser to correspond with the lead. This very act of establishing an angular relation between the milling-tool and the chaser-blank effects the peculiarity desired in the formation of the acting face of the chaser when the latter is moved radially into engagement with the mill—viz., the cutting of the said acting face on different angles at different points in its length—which will be best understood by reference to Figs. 12 and 13. The axis of the milling-cutter (indicated by the line $y\, y$ in these figures) at different points bears different relations to the face of the chaser, so that the circles of the milling-teeth vary throughout the longitudinal extent of the chaser. Take the point designated $t^5$ in Fig. 17, (this being the forward end of the axis of the mill,) and the circle described thereabout and indicated by the broken line $t^6$ will be found to traverse the face of the chaser so as to create in the milling action a cutting edge at the front side $u^2$ of the chaser at the point $u$, for that point in the plane of the front side of the chaser is the lowest point traversed by the circle of the milling-tool. The highest point is at the back side of the chaser at $u'$, and thereby a full clearance is obtained. On the other hand, when the back end of the chaser is considered, the center $t^7$, about which the milling-tool at this part revolves, has changed in its relation to the face of the chaser as compared with the milling center at the front, so that the highest point traversed is now at the front side of the chaser, as indicated at $u^5$, and the lowest point is at the back side, as indicated at $u^3$. A line embracing the points of intersection of the various circles of the milling-teeth (as the point $u^6$, Fig. 17) will follow a line-contact between the chaser and the work, and that line-contact will extend from the point of the last tooth to cut back into the chaser to the point $u^6$. This peculiarity of the acting face of the die may be stated in this wise, that the edges of the several teeth lie in different intersecting planes on different angles to the front side of the die, so that the amount of clearance decreases from the front end of the die to the back end while the points of the teeth recede from cutting position, the line of contact between the die and the work at the rear portion of the die being in the body of the die and not at the points of the teeth, as heretofore. The idea is to get a free cutting edge at the front end of the chaser, as shown at $u$ in Fig. 6, with a full clearance back of the same, as shown as $u'$; but in passing back through the chaser the clearance decreases and the line of contact of the chaser with the work recedes from the plane of the face $u^2$ of the chaser while the points of the teeth at the front side $u^2$ leave the work. At the back of the die there is no cutting clearance, (see Fig. 7,) and a good leading contact is had, as shown at $u^3$, the teeth of the chaser occupying the thread of the work throughout the width of the chaser, but pressing closely on the work only at the middle. To make this more clear, I have shown in Fig. 8 a line $v\, v$, which indicates the plane of the face of the cutter, and a line $t\, t$, indicating the longitudinal line of contact between the work and the cutter.

The longitudinal line embracing the points of the teeth at the front side of the chaser gradually leaves the work, while the longitudinal line of contact between the chaser and the work moves back into the chaser. In other words, the points of the teeth back of a few which do the actual cutting have no cutting engagement with the work and cannot have under any circumstances, (which is clearly illustrated in Fig. 7,) there being a controlling-line of contact in the body of the die, which line recedes from the plane of the front side of the die.

Chaser-cutters of this character will operate on the work with a perfect lead, and the result is absolute uniformity in any length of thread.

The essential peculiarity of the chaser may be described as that of having a cutting-clearance at the forward end or mouth and no such clearance at the back or heel, so that it forms a cutting-tool at the entrance and a leading-nut at the rear.

I believe it to be new with me to accomplish this result by a peculiar formation of the acting face of the chaser, and while I have described the peculiarity as being produced by a milling process I do not wish to be understood as limiting myself to any particular mode of producing the necessary peculiarity of formation, for it may be accomplished in a variety of ways.

By reference to Fig. 1 the face of the cam $f$ may be seen to be inscribed with marks M for registry with similar marks on the chasers, so that when a new set of chasers is placed in the dies a proper adjustment of the cam with relation thereto may be assured by causing the marks to register.

What I claim as my invention is as follows:

1. A chaser-cutter the edges of the teeth of the acting face of which lie in different intersecting planes on different angles to the plane of the front side of the chaser-cutter forming the front side of the teeth.

2. A chaser-cutter the edges of the teeth of whose acting face constitute arcs of circles described about different centers embraced in a line extending on an angle to the plane of the front side of the chaser-cutter forming the front side of the teeth.

3. A chaser-cutter the edges of whose teeth extend at varying angles transversely of the cutter, those at the front or mouth extending on an angle to form cutting edges at one side of the chaser with full clearance, whereas the angle at the rear or heel is such as to remove the points of the teeth from contact with the work and throw the line of contact into the body of the cutter.

4. In a screw-cutting die, the combination with the die-body and the chaser-controlling cam movable on said die-body to vary the cutting diameter, of an adjustable abutment determining the closed position of the cam, said abutment having a plurality of differentiated abutment-faces, substantially as and for the purpose described.

5. In a screw-cutting die, the combination with a die-body and a chaser-controlling cam and cam-holder, of a spring-pressed sliding bolt carried by said holder and adapted for engagement with the die-body to determine the closed position of the cam, said bolt having a plurality of faces for engagement with the die-body differentiated as to distance from the longitudinal center of the bolt, substantially as and for the purpose described.

6. In a screw-cutting die, the combination with a chaser and holding and controlling means therefor, with provision for lateral play of the chaser: of adjusting means for determining the leading engagement of the chaser with the work, substantially as described.

7. In a screw-cutting die, the combination of a die-body, chasers therein, a cam engaging said chasers, a cam-holder rotatable on the cam-body and having an inwardly and outwardly adjustable flange or ring overhanging the cam, substantially as and for the purpose described.

In testimony whereof I have signed my name to this specification, in the presence of two subscribing witnesses, this 6th day of June, A. D. 1895.

JAMES HARTNESS.

Witnesses:
   A. D. HARRISON,
   W. P. ABELL.